Aug. 22, 1950 N. D. PRESTON 2,519,979

CODED TRACK CIRCUIT SIGNALING SYSTEM FOR RAILROADS

Filed April 5, 1946 5 Sheets-Sheet 1

*INVENTOR.*

Neil D. Preston

CODED TRACK CIRCUIT SIGNALING SYSTEM FOR RAILROADS

Filed April 5, 1946 5 Sheets-Sheet 2

INVENTOR.
Neil D. Preston

CODED TRACK CIRCUIT SIGNALING SYSTEM FOR RAILROADS

INVENTOR.
Neil D. Preston

CODED TRACK CIRCUIT SIGNALING SYSTEM FOR RAILROADS

Filed April 5, 1946 5 Sheets-Sheet 4

INVENTOR.

Neil D. Preston

Aug. 22, 1950 N. D. PRESTON 2,519,979

CODED TRACK CIRCUIT SIGNALING SYSTEM FOR RAILROADS

Filed April 5, 1946 5 Sheets-Sheet 5

INVENTOR.

Neil D. Preston

Patented Aug. 22, 1950 2,519,979

UNITED STATES PATENT OFFICE 2,519,979

CODED TRACK CIRCUIT SIGNALING SYSTEM FOR RAILROADS

Neil D. Preston, Rochester, N. Y., assignor to General Railway Signal Company, Rochester, N. Y.

Application April 5, 1946, Serial No. 659,682

14 Claims. (Cl. 246—38)

This invention relates to coded track circuit signalling systems for railroads, and it more particularly pertains to such systems in which the coded track circuits are normally inactive, but are automatically rendered active for a predetermined number of track sections in advance of a train as the train progresses.

In coded track circuit signalling systems the track circuits are quite often of considerable length and track circuit code transmitter contacts are required to break a relatively heavy load, particularly where ballast resistance is low. It is therefore desirable from the standpoint of prolonging the life of the coding contacts, and for other considerations, to render the code transmitters active for the respective track sections only when they are required for the transmission of track circuit codes required to provide desired signal indications immediately in advance of a train.

An object of the present invention is to provide improvements in the normally inactive coded track circuit system disclosed in the prior application of Reichard, Ser. No. 567,995, filed December 13, 1944, now Patent No. 2,488,683, dated November 22, 1949, so as to render the system more readily applicable to varying requirements of practice, such, for example, as for either three or four block signalling systems, without requiring the use of polarized control of track circuit energization for governing the initiation of track circuit code transmitters for respective track sections in advance of a train.

Generally speaking, and without attempting to define the scope of the present invention, the present invention contemplates the steady energization of the track rails at the entrance end of the respective track sections under normal conditions when the trackway is unoccupied by trains.

The initiation of code operation when a train approaches the equipped territory may be rendered effective by any one of a number of means, such as by manual control, the entrance of a train into a starting track section, or the entrance of a train into a track section of the equipped territory. Such initiation is provided by the removal of steady energization of the first track section of the equipped territory which is effective to start a driven code transmitter at the exit end of that track section and also to initiate the removal of steady energization from the track sections in advance successively. The removal of steady energization of each track section initiates the track circuit code transmitter at the exit end of that track section to transmit a selected driven code. The driven code transmitted is selected as a clear or caution signal control code in accordance with whenther or not a caution track circuit code is received at the entrance end of the next adjoining track section in advance.

When a clear track circuit code is received at the entrance end of a track section, other than the first track section in the equipped territory, an inverse or "off" code transmitter is initiated at that end, provided that there is no train immediately in approach of the signal governing entrance to that track section, and the reception of that inverse code at the exit end of that track section starts the initiation of inverse code transmitters successively for each of the track sections in advance which has its driven code transmitter active. The reception of an inverse code at the exit end of the track section farthest in advance having its driven code transmitter active, forestalls the removal of the steady energization from the next track section in advance to prevent further propagation of the starting of driven code transmitters.

As a means for allowing time for code rates of the driven code transmitters to build up and initiate the transmission of inverse codes, it is provided by the use of timing means that the removal of steady energization from one track section will effect the removal of the steady energization from the next track section in advance, only after there has been sufficient time for the driven code to build up to a signal-clear code in a track section in the rear to initiate the transmission of inverse codes and thereby forestall the removal of steady energization for track sections farther in advance.

Thus, from the above general description it will be obvious that each time a train advances a track section and causes the removal of the inverse code, the steady energization is removed from another track section in advance and thereby renders the driven code transmitter active at the exit end of that advance track section. The reception of a driven code at the entrance end of that advance section is effective to increase the code rate in the adjoining track section in the rear to provide that the inverse code transmitter at the entrance end of such adjoining section is rendered active to reestablish inverse code transmission through the respective track sections to thereby forestall the further propagation of the starting of track circuit code transmitters for track sections farther in advance.

By the use of a relay at the exit end of each of the track sections connected in series in the track circuit, it is provided that the approach of a train to a signal causes the removal of the inverse code in advance of that signal to thereby initiate a tumble-down of the inverse code for the respective track sections for the purpose of rendering active the track circuit code transmitter for another track section in advance. By this arrangement, considering the trackway in advance of a train to be unoccupied, track circuit code is built up sufficiently in advance of a train so that the signal governing entrance to each track section is controlled to provide a clear indication before the approaching train enters the track section in the rear of that signal.

Other objects, purposes and characteristic features of the present invention will be in part obvious from the accompanying drawings, and in part pointed out as the description of the invention progresses.

In describing the invention in detail reference will be made to the accompanying drawings in which parts having similar functions are designated by similar letter reference characters generally made distinctive by preceding numerals indicative of the respective signals with which such parts are more directly associated, and in which:

Figs. 1A and 1B when placed side by side respectively, illustrate one embodiment of the present inventon as applied to a typical stretch of trackway provided with three block indication signalling for a single direction of traffic;

Figure 1A:
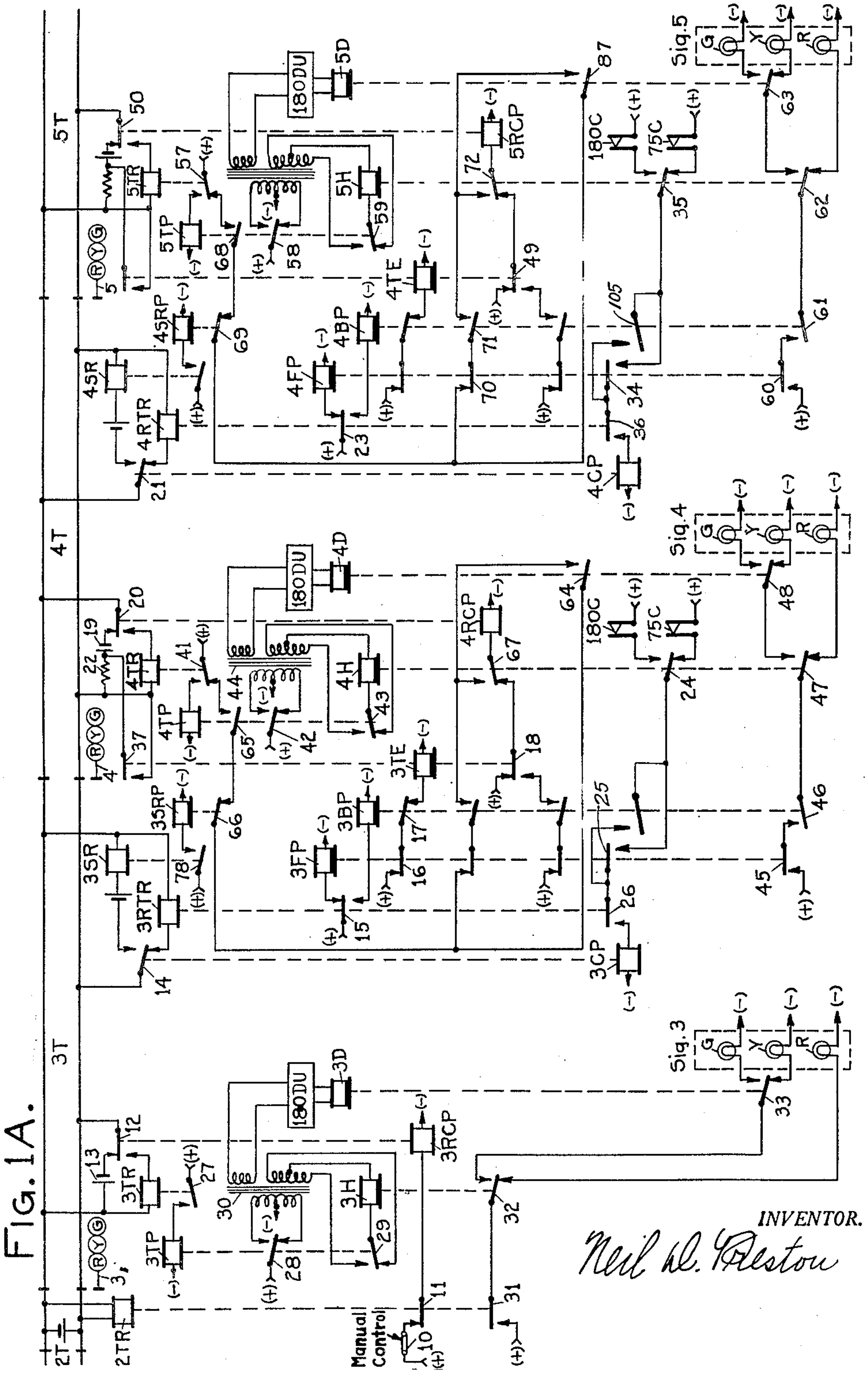
Figure 1B:
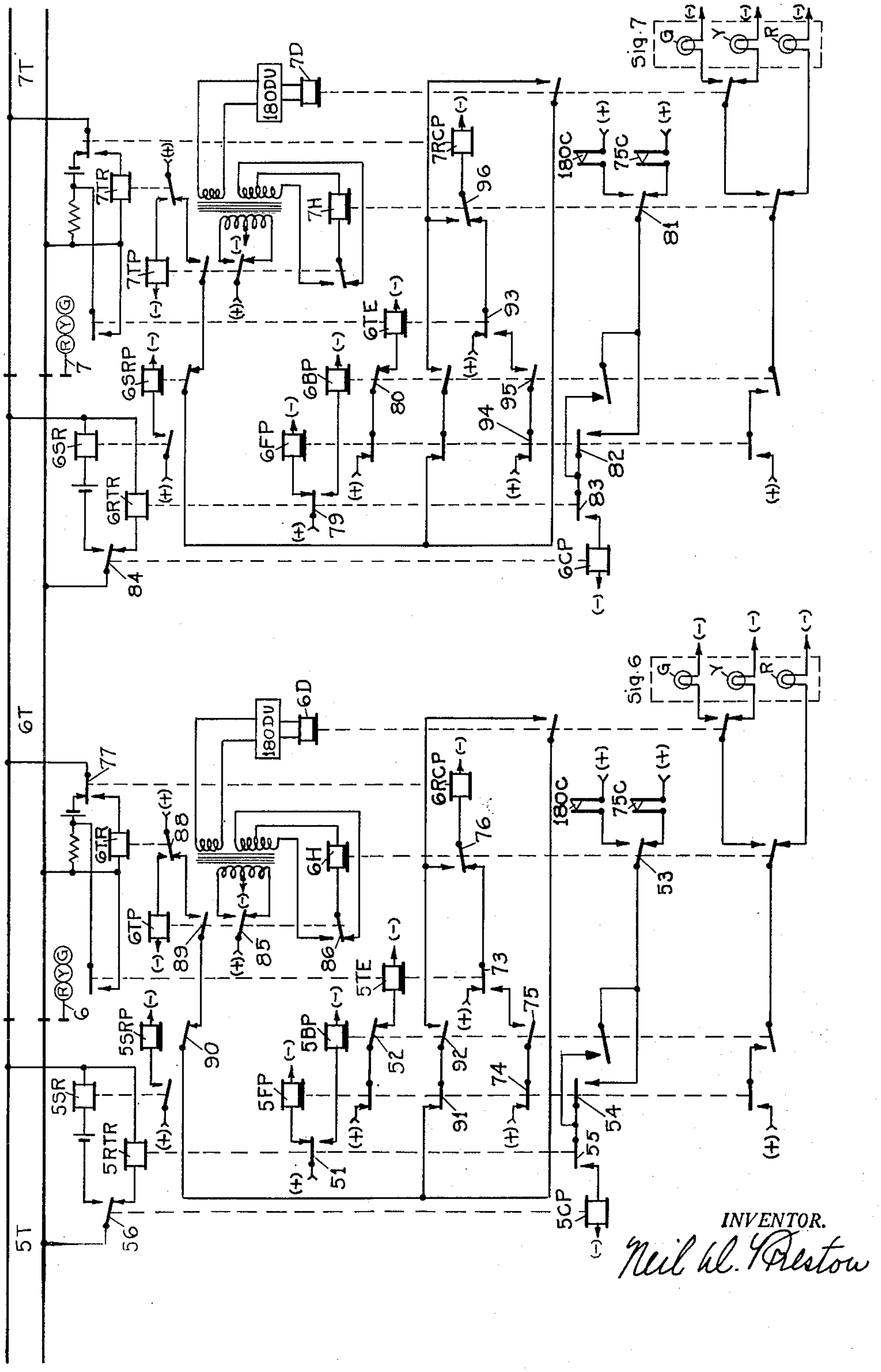
Figure 2:
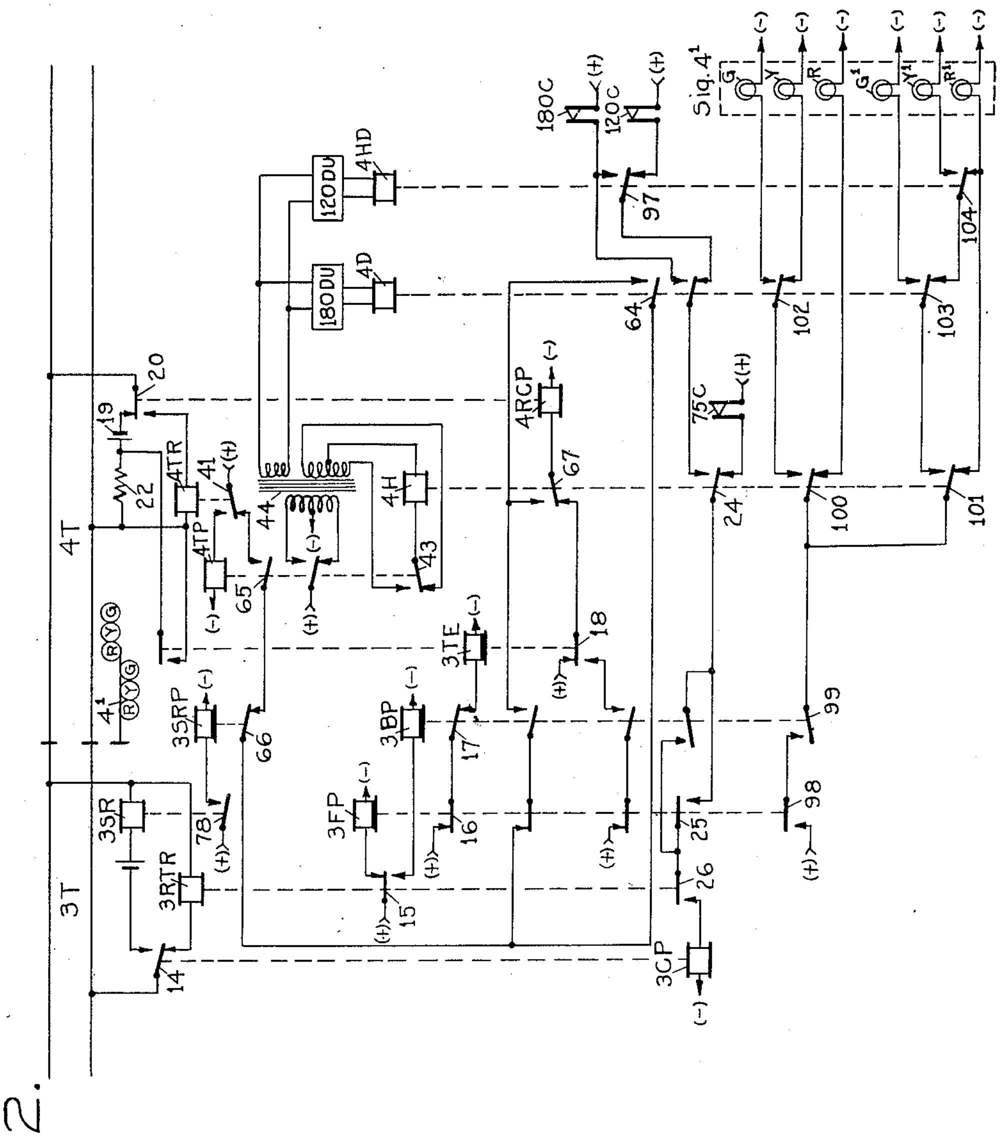
Fig. 2 illustrates another embodiment of the present invention as applied to a typical stretch of trackway provided with a four block signalling system.
Figure 5:
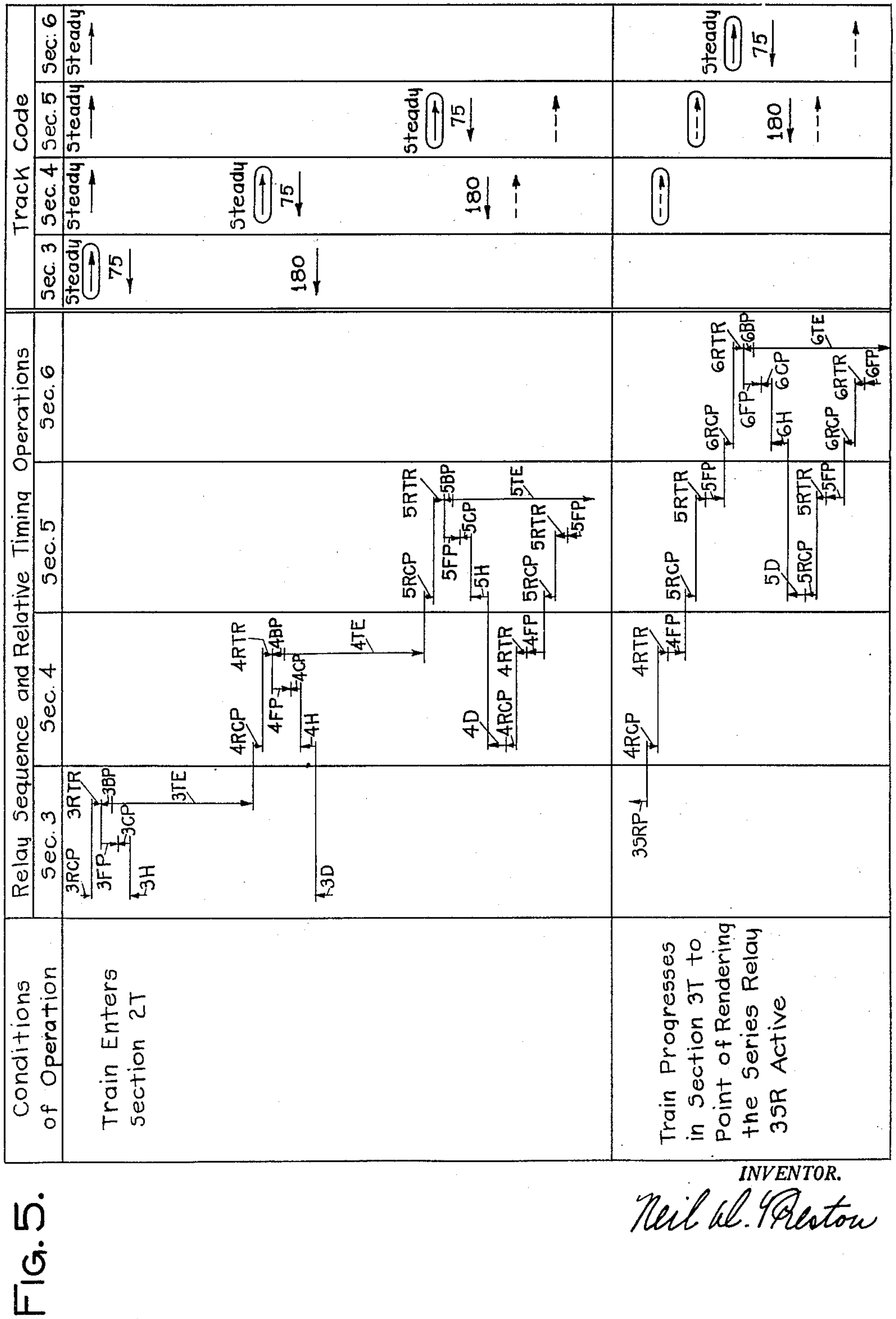

Figs. 4A, 4B, 4C and 4D are track diagrams illustrating specific conditions of track circuit coding and signal indications provided under various operating conditions as a train progresses along the trackway for the embodiment of the present invention as shown in Fig. 2; and Fig. 5 illustrates by relay timing charts the sequence of relay operations of the system as disclosed in Fig. 1 under certain specific conditions of traffic, together with the approximate relative timing of the relay operations.

The organization of the apparatus has been illustrated in the drawings by schematic wiring diagrams more particularly adapted to facilitate the disclosure of the invention as to the mode of operation than to illustrate the specific construction and arrangement of parts that would be employed in practice. The symbols (+) and (−) are used to indicate connections to the respective positive and negative terminals of batteries or other suitable sources of direct current.

In describing the general operation of the system, reference is made from time to time to functions common to all parts of a similar character by use in the description of letter reference characters without their preceding numerals for the designation of such parts, and it is to be understood that such a reference applies to parts designated in the drawings by similar letter reference characters having preceding numerals associated therewith.

With reference to Figs. 1A and 1B, a typical portion of trackway for this embodiment of the present invention is illustrated as comprising the adjoining track sections 2T, 3T, 4T, 5T, 6T and 7T such track sections being separated by insulated rail joints in the usual manner. This stretch of track is assumed to be at the beginning of a stretch equipped with normally deenergized coded track circuits according to the system provided by the present invention.

Signals are provided at the entrance to the respective track sections for governing eastbound traffic (to the right), the signals 3, 4, 5, 6 and 7 being illustrated as governing entrance to the track sections 3T, 4T, 5T, 6T and 7T respectively. Although the signals illustrated are of the color light type having individual red, yellow and green light signal units for providing respective danger, caution and clear signal indications, it is to be understood that other types of signals such as semaphore signals, position light signals, or searchlight signals could as well be employed in accordance with the requirements of practice.

Code following track relays TR are associated with the entrance ends of the respective track sections for receiving the track circuit codes and each of such relays has associated therewith a code following track repeater relay TP which is effective, by the pulsing of its contacts, to provide for the steady energization of a relatively slow acting code receiving relay H, which is steadily picked up upon the reception of a track circuit code of any code rate. A relatively slow acting relay D for each track section is responsive only to the pulsing of the contacts of the relay TP for that track section at a 180 code rate.

An inverse code transmitter relay RCP is associated with the entrance end of each of the track sections for connecting a track battery across the track rails at the entrance end of that track section under normal conditions to steadily energize the track rails, and for intermittently connecting the track battery across the track rails for the transmission of inverse code pulses at selected times when a driven code is transmitted through the track rails from the opposite end of that track section. The relay 3RCP serves only to apply steady energization to the entrance end of track section 3T because that is the first coded track section included in the territory equipped according to the present invention, and it will be apparent as the description progresses that the transmission of an inverse code in this first track section is not required.

At the exit end of each of the track sections is an inverse code following track relay RTR normally connected across the track rails, and a code following series relay SR which is connected in series with the track battery feeding the track circuit at the exit end. Such series relay is rendered active to follow the code applied to the track rails at the exit end when an abnormal amount of current flows through the track circuit as upon the approach of a train to the exit end of that track section. When the relay SR is active at the exit end of a track section, it is effective to pick up a slow acting repeater relay SRP which is effective to remain steadily picked up as long as that series relay SR is active.

When the inverse code receiving relay RTR is active at the exit end of each of the track sections, it energizes both a front contact repeater relay FP, and a back contact repeater relay BP, such relays being sufficiently slow acting to be steadily picked up and thus provide in combination a means distinctively responsive to the reception of an inverse code as compared to the steady energization of the track rails.

A code transmitter relay CP is associated with the exit end of each of the track sections and it is effective when rendered active to cause the application of driven code pulses to the track rails at a code rate selected in accordance with the condition of the relay H for the entrance end of the adjoining track section in advance. The code pulses of the driven code are formed by coding contacts 75C and 180C which can be operated by any suitable means such as motor driven coders or code oscillators, separate sets of coding contacts being provided at the respective signal locations.

A slow drop-away relay TE, or other suitable timing device, is associated with the entrance end of each of the track sections for use in providing a time delay in the rendering active of the coded track circuit for the next track section in advance under certain conditions to be hereinafter pointed out.

Having thus considered the general organization of the apparatus, its mode of operation will be hereinafter considered with reference to specific operating conditions to be encountered in practice.

The normal condition of the apparatus, with no trains present or in immediate approach of the equipped territory, is that the code transmitters and code receivers are inactive, and each of the track sections is steadily energized from the entrance end of that track section. Thus, the relay 3RCP is picked up to provide steady energization of the track rails of track section 3T by the energization of a circuit extending from (+), including the manual control contact 10, front contact 11 of relay 2TR, and winding of relay 3RCP, to (−). In accordance with the closure of front contact 12 of the relay 3RCP, steady energization is applied to the track rails of the track section 3T for maintaining the relay 3RTR at the exit end of that track section steadily energized. Such circuit extends from the positive terminal of track battery 13 including front contact 12 of relay 3RCP, lower rail of the track section 3T, back contact 14 of relay 3CP, winding of relay 3RTR, and upper rail of track section 3T, to the negative terminal of the track battery 13.

At the exit ends of the track section 3T, the steady energization of relay 3RTR is effective by the closure of front contact 15 to maintain the relay 3FP steadily energized, and the relay 3BP is deenergized because of its circuit being open at back contact 15 of relay 3RTR. In accordance with the relay 3FP being picked up and the relay 3PB being dropped away, the timing relay 3TE is steadily energized under normal conditions by an obvious circuit closed at front contact 16 of relay 3FP and back contact 17 of relay 3BP.

The closure of front contact 18 of relay 3TE provides that the relay 4RCP associated with the entrance end of the track section 4T is steadily energized to provide for the steady energization of the track circuit for the track section 4T. Such track circuit extends from the positive terminal of the track battery 19 including front contact 20 of relay 4RCP, upper rail of track section 4T, back contact 21 of relay 4CP, winding of relay 4RTR, lower rail of track section 4T, and the resistance 22, to the negative terminal of the track battery 19.

It will be noted that a resistance is included in series with the track battery at the entrance end of each of the track sections having an inverse code transmitter, and a means is provided for shunting the resistance when the relay TE for the exit end of the next track section in the rear is dropped away. The purpose of this resistance is to conserve energy, as the voltage required to maintain proper coding operation in a coded track circuit is generally higher than that required for the steady energization of a track relay. Thus, it is provided that a resistance is maintained in series with the track battery for each track section when that track section is steadily energized, but is shunted when the track battery is used to supply energy for the pulses of an inverse code. More specifically, with reference to the track circuit just described, the resistance 22 is shunted by back contact 37 of the relay 3TE when that relay is dropped away. It will be apparent that the relay 3TE is necessarily dropped away whenever the relay 4RCP is active for the transmission of an inverse code as will be more apparent as the description progresses.

The steady energization of the relay 4RTR at the exit end of the track section 4T is effective by the closure of its front contact 23 to energize the relay 4FP and provide for the relay 4BP to be dropped away and thus provide a circuit for the steady energization of the relay 4TE, all in a manner corresponding to the manner just described for energizing relays of similar letter reference characters associated with the exit end of the track section 3T.

It is to be understood that the normal conditions described with respect to the apparatus associated with the track section 4T is typical of the normal conditions of the apparatus associated with the respective track sections 5T and 6T.

To consider how the track circuit coding apparatus can be initiated at the entering end of the equipped territory, it will be assumed that initiation is provided by either the manual opening of contact 10 or by the entrance of an approaching train into the track section 2T to cause the dropping away of the normally energized track relay 2TR. The illustration of the control of the relay 3RCP by the manual contact is to be considered merely as a symbol of different types of manual, or even automatic control, that can be employed in practice as a means for initiating the coded track circuits at the entrance end of the equipped territory. As an example of a condition which could be encountered in practice, it could be provided that the equipped territory would be adjacent an interlocking plant, and that the clearing of a signal for an eastbound train at the exit end of the interlocking plant could very well be the control means provided for rendering effective the initiation of the coded track circuits at the beginning of the equipped territory.

Either of the above initiation conditions is effective in an obvious manner to cause the dropping away of the relay 3RCP, and the dropping away of that relay, by opening front contact 12, removes the steady energization from the track rails of the track section 3T and thus causes the dropping away of the relay 3RTR at the exit end of that track section. The dropping away of such relay, by the closure of back contact 15, causes the picking up of the back contact repeater relay 3BP, which is preferably a relay having relatively quick pick-up, but slow drop-away characteristics.

The picking up of relay 3BP opens the circuit for the timing relay 3TE at back contact 17 to cause that relay to be dropped away. With reference to the sequence chart of Fig. 5, it will be noted that the time required for the dropping away of the relay 3TE delays the removal of the steady energization of the next track section in advance for reasons to be more apparent as the description progresses.

With the relays 3RTR and 3FP dropped away, the code transmitter relay 3CP is rendered active to transmit a 75 driven code as selected by the closure of back contact 24 of the relay 4H. Thus the relay 3CP becomes energized for each pulse of the oscillator contact 75C by a circuit extending from (+), including oscillator contact 75C, back contact 24 of relay 4H, back contact 25 of relay 3FP, back contact 26 of relay 3RTR, and winding of relay 3CP, to (−).

The reception at the left-hand end of the track section 3T of the driven code causes the pulsing of the track relay 3TR because such track relay is connected across the track rails through the back contact 12 of the relay 3RCP, and the pulsing of front contact 27 of relay 3TR causes the track repeater relay 3TP to become active and by pulsing contacts 28 and 29 to provide for the picking up of the relay 3H. The pulsing of contact 28 of relay 3TP applies energy first in one direction and then the other to the primary winding of the decoding transformer 30, and by pulsing of contact 29 provides for the rectification of the output voltage of the transformer 30 to provide for the energization of the relay 3H by pulsating direct current. The relay 3H is sufficiently slow acting to be steadily picked up as long as the relay 3TP remains active.

Upon the picking up of the relay 3H, the yellow lamp of the signal 3 becomes energized (assuming the track section 2T to be occupied by an approaching train) by a circuit extending from (+), including back contact 31 of relay 2TR, front contact 32 of relay 3H, back contact 33 of relay 3D, and the lamp Y of signal 3, to (−).

After the slow release relay 3TE at the exit end of the track section 3T has become dropped away, the relay 4RCP is dropped away to remove steady energization of the track section 4T by the opening of its front contact 20. The relay 4RCP is dropped away under such conditions by the opening of the circuit by which it is normally energized at front contact 18 and the relay 3TE.

The removal of steady energization from the track section 4T is effective at the exit end of that track section to cause the dropping away of the relays 4RTR and 4FP and the picking up of relay 4BP to cause the deenergization of the slow drop-away relay 4TE and also initiate the driven code transmitter relay 4CP for the transmission of a track circuit code at a 75 rate. The relay 4CP becomes active upon the closure of back contact 34 of relay 4FP by the energization of a circuit closed for each pulse of the coding contact 75C, such circuit extending from (+), including the coding contact 75C, back contact 35 of relay 5H, back contact 34 of relay 4FP, back contact 36 of relay 4RTR, and winding of relay 4CP, to (−).

Upon the reception of the 75 driven code at the entrance end of the track section 4T, the pulsing of contact 41 of relay 4TR renders the repeater relay 4TP active to pulse contacts 42 and 43 for energizing the relay 4H through the decoding transformer 44.

In response to the picking up of the relay 4H, the yellow lamp of signal 4 is energized by a circuit extending from (+), including back contact 45 of relay 3FP, front contact 46 of relay 3BP, front contact 47 of relay 4H, back contact 48 of relay 4D, and the yellow lamp Y of signal 4, to (−).

The picking up of relay 4H is also effective to increase the code rate in the track section 3T in the rear of signal 4 in an obvious manner upon the shifting of contact 24 in the circuit for the relay 3CP. The increase in the code rate in the track section 3T from a 75 to a 180 rate provides for the energization of the relay 3D because such relay is distinctively responsive to the 180 rate as compared to the 75 rate in accordance with its tuned circuit and rectifier unit 180DU. Thus, the picking up of the relay 3D under such conditions is effective by the shifting of contact 33 in the signal control circuit of the signal 3 to extinguish the yellow lamp in that signal and provide a circuit for the energization of the green lamp G to thereby change the indication provided by the signal from a caution to a clear indication.

It has been pointed out in describing the general organization of the system that the reception of a signal-clear code (180 code) at the entrance end of a track section is effective to render an inverse code transmitter active at that end to initiate the transmission of inverse codes through the respective track sections having their driven code transmitters active to thereby limit the propagation of the starting of code transmitters for track sections farther in advance. At the beginning of the equipped territory, however, it will be readily apparent that it is desirable to allow track circuit code to be transmitted in the track section 5T so that the signal 4 can be cleared prior to the entrance of the approaching train into the track section 3T. In other words, it is desirable that the track circuit coding be established so that the signal 4 governing passage of a train out of the track section 3T can provide a clear indication prior to the entrance of the train into the track section 3T immediately in approach of such signal. It will be readily apparent as the description progresses that this type of control of the signals is maintained throughout the stretch of track that is equipped according to the present invention by the use of a series type approach track relay. Inasmuch as track section 3T is the first track section having a coded track circuit, it is provided that the reception of a 180 driven code at the left-hand end of that track section does not cause the transmission of an inverse code, and thus the code transmitter for the track section 5T is allowed to become active as illustrated by the sequence chart of Fig. 5; and such code transmitter being rendered active is effective through a sequence of relay operations to build up the track circuit code in the track section 4T to a signal-clear code (180 code and by so doing render the inverse code transmitter effective for the entrance end of the track section 4T as a means for limiting the further propagation of the starting of track circuit code transmitters for track sections farther in advance.

More specifically, with reference to Figs. 1A and 1B, after the slow drop-away relay 4TE has had time to drop away, the opening of front contact 49 of that relay is effective in an obvious manner to cause the deenergization of the relay 5RCP. The dropping away of relay 5RCP opens the circuit at front contact 50 by which the track rails of section 5T have been normally energized by steady energization, and the deenergization of that track section provides for the dropping away of the track relay 5RTR at the exit end of that track section.

Upon the dropping away of the relay 5RTR, the shifting of contact 51 of that relay causes the relay 5BP to be picked up and the relay 5FP to be dropped away. Upon the picking up of relay 5BP, the opening of back contact 52 deenergizes the relay 5TE to cause that relay to start its timing.

In response to the dropping away of the relay 5FP, the relay 5CP becomes active for the transmission of a 75 driven code at the exit end of the track section 5T by the energization of a circuit extending from (+), including coding contact 75C, back contact 53 of relay 6H, back contact 54 of relay 5FP, back contact 55 of relay 5RTR, and winding of relay 5CP, to (—). The pulsing of contact 56 of the relay 5CP applies the driven code pulses to the track rails, and the reception of such pulses at the entrance end of the track section 5T causes the pulsing of contact 57 of the relay 5TR, which in turn causes the pulsing of the contacts 58 and 59 of relay 5TP to provide for the picking up of the relay 5H. The picking up of the relay 5H, with the relay 5D dropped away, closes a circuit for the energization of the yellow lamp Y of signal 5 extending from (+), including back contact 60 of relay 4FP, front contact 61 of relay 4BP, front contact 62 of relay 5H, back contact 63 of relay 5D, and the yellow lamp Y of signal 5, to (—).

The shifting of contact 35 of the relay 5H upon the picking up of that relay changes the code rate transmitted in the track section 4T from a 75 to a 180 rate in an obvious manner. In accordance with the increase in the code rate in the track circuit of the track section 4T, the relay 4D at the entrance end of that track section becomes responsive to the 180 rate, and by its picking up, the shifting of contact 48 of that relay causes the extinguishing of the yellow lamp Y of signal 4 and the energization of the green lamp G of that signal.

In accordance with the reception at the entrance end of the track section 4T of a signal clear (180) code the relay 4RCP is rendered active for the transmission of an inverse code, such relay being rendered active in accordance with the closure of front contact 64 of relay 4D. The relay 4RCP is energized upon the dropping away of the relay 4TR upon the termination of each driven code pulse by a circuit extending from (+), including back contact 41 of relay 4TR, front contact 65 of relay 4TP, back contact 66 of relay 3SRP, front contact 64 of relay 4D, front contact 67 of relay 4H, and winding of relay 4RCP, to (—). The dropping away of the relay 4TP subsequent to the opening of its circuit at front contact 41 of relay 4TR terminates the inverse code pulse by opening the circuit for the relay 4RCP at front contact 65. Thus, in this manner, an inverse code pulse is transmitted upon the termination of each driven code pulse received at the entrance end of the track section 4T.

The pulsing of the contact 23 of the relay 4RTR at the exit end of the track section 4T upon the reception of the inverse code causes the relay 4FP to be picked up, and the relay 4BP to remain picked up. The energization of the relay 4BP to close its front contact 105 in multiple with the back contact 34 of relay 4FP, permits the relay 4CP to be active when relay 4RTR is steadily or intermittently deenergized. If desired the contacts 34 and 105 of relays 4FP and 4BP respectively may be omitted to leave the operating circuit for relay 4CP controlled only by the back contact 36 of the track relay 4RTR as disclosed in the above mentioned prior application of W. H. Reichard, Ser. No. 567,995, filed December 13, 1944, now Patent Number 2,488,683 dated November 22, 1949. Upon picking up of the relay 4FP in response to the inverse code, the inverse code transmitter relay 5RCP is rendered active for the transmission of an inverse code in the track section 5T. The relay 5RCP is energized upon the dropping away of the relay 5TR at the end of each driven code pulse transmitted through the track rails of the track section 5T by a circuit extending from (+), including back contact 57 of relay 5TR, front contact 68 of relay 5TP, back contact 69 of relay 4SRP, front contact 70 of relay 4FP, front contact 71 of relay 4BP, front contact 72 of relay 5H, and winding of relay 5RCP, to (—).

With reference to Fig. 1B, the reception at the exit end of the track section 5T of the inverse code causes the pulsing of contact 51 of the relay 5RTR, and the pulsing of such contact provides for the picking up of the relay 5FP and for maintaining the relay 5BP picked up. The maintaining picked up of the relay 5BP holds the circuit open for the relay 5TE at back contact 52, but the picking up of the relay 5FP, with the relay 5BP already picked up conditions a circuit by which the relay 6RCP can be steadily energized when the relay 5TE has had time to drop away and open the circuit at front contact 73 by which the relay 6RCP has been normally energized. Thus, it is provided upon the dropping away of the relay 5TE that the relay 6RCP is maintained steadily energized in accordance with the reception of an inverse code at the exit end of the track section 5T. The circuit by which relay 6RCP is energized under such conditions extends from (+), including front contact 74 of relay 5FP, front contact 75 of relay 5BP, back contact 73 of relay 5TE, back contact 76 of relay 6H, and winding of relay 6RCP, to (—). The relay 6RCP is therefore effective to maintain the track section 6T steadily energized by the closure of its front contact 77 until the removal of its steady energization becomes effective as the train progresses.

Upon a consideration of the series of events that has taken place in connection with the mode of operation described above, and with reference to the sequence and timing chart of Fig. 5, it will be apparent that the circuit organization provides for a tumble-down operation for the removal of the steady energization for the respective track sections, such tumble-down being effective from one track section to another only after a time delay of sufficient length to allow track circuit code to build up to a signal clear code and thereby establish inverse code transmission through the respective track sections to forestall further tumble-down effect with respect to the removal of the steady energization for the respective track sections. It is therefore essential, under the specific conditions just described, that the time of dropping away of the timing relay 5TE, for example, be sufficient to allow the series of events to take place, subsequent to the picking up of relay 5BP, as they have been described, so as to provide for the picking up of the relay 5FP at the exit end of the track section 5T to thereby condition a circuit by which the relay 6RCP can be maintained steadily energized after the completion of the timing of the dropping away of the relay 5TE.

Figures 3A, 3B, 3C, 3D, 4A, 4B, 4C, 4D:
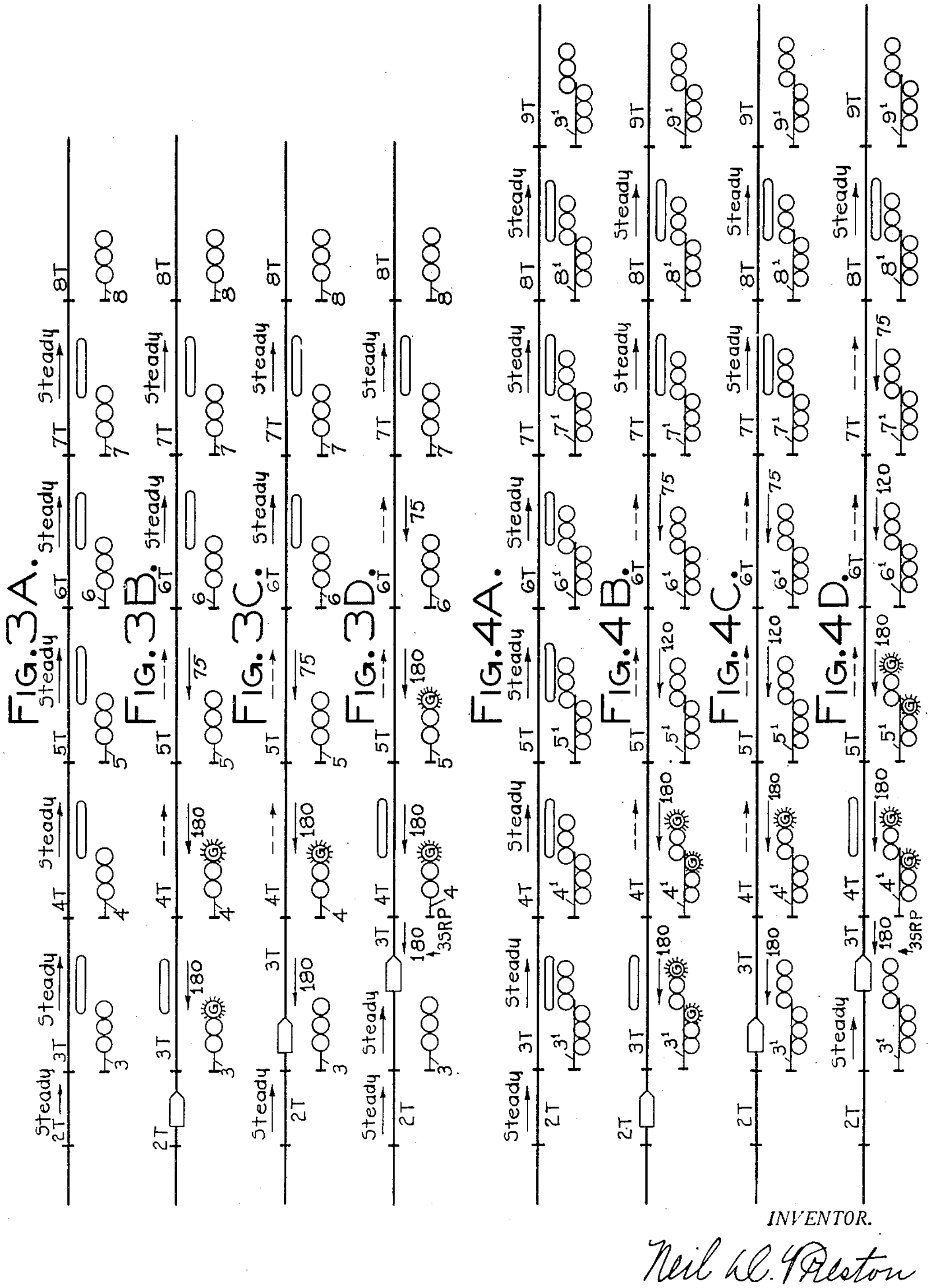
Figs. 3A, 3B, 3C and 3D are track diagrams illustrating specific conditions of track circuit coding and signal indications provided under various operating conditions as a train progresses along the trackway for the embodiment of the present invention as shown in Figs. 1A and 1B.

Although it has been described that the signal lamps become energized as the code builds up through the respective track sections, it will be apparent that the combination of contacts of the relays FP and BP in the respective signal control circuits is effective to allow the signal lamps to be energized only in the absence of an inverse code, or steady energization, in the track rails of the track section in the rear. More specifically, for example, the reception of an inverse code at the exit end of the track section 4T under the condition described above opens the circuit for the signal lamps of signal 5 upon the picking up of the relay 4FP at back contact 60, such circuit being open under normal conditions, when the track section 4T is steadily energized, at back contact 61 of relay 4BP. With these principles of operation in mind, the conditions of approach lighting shown in the track diagrams of Figs. 3A through 3D and 4B through 4D will be readily understood. In Figure 3A, each of the signals has its light circuit normally deenergized because of steady energization of the track section in the rear. With reference to Fig. 3B, however, the signal 3 is energized due to the presence of the approaching train in the track section 2T in the rear of that signal, and the signal 4 is energized in accordance with the absence of an inverse code or a condition of steady energization in the track section 3T in the rear of that signal. Although the signal 5 is conditioned for a caution indication in accordance with the reception of a track circuit code at a 75 rate at the entrance end of the track section 5T, the yellow lamp Y of that signal is not energized because of the presence of an inverse code in the track section 4T in the rear of that signal. Thus, it will be noted that as the train progresses to render the series relay 3SR active, as is illustrated in Fig. 3D, the picking up of the series repeater relay 3SRP renders the inverse code transmitter inactive for the track section 4T and thus provides for the energization of the signal 5. It will be readily apparent that the mode of operation of approach lighting which has been described with respect to the control of signals in a three-block signalling system is applied in a similar manner to control the lighting of signals for a four-block signal system such as the control of the signal $4^1$ as illustrated in Fig. 2.

Having thus considered the conditioning of the system for the entrance of a train into the equipped territory, it will be assumed that an eastbound train accepts the clear signal 3 and enters the track section 3T. The shunting of the track section 3T causes the relays 3TR and 3TP to be rendered inactive and thus provides for the dropping away of the relays 3H and 3D. Upon the shifting of contact 32 of relay 3H, the circuit for the green lamp G of signal 3 is opened and the red lamp R of that signal becomes energized. It will be noted that the red lamp R of the signal 3 remains energized as long as the short approach track section 2T is occupied by the train in accordance with the closure of back contact 31 of the relay 2TR. It is to be understood that other types of approach lighting for the signal 3 for governing entrance to the territory equipped with coded track circuits could as well be provided, or such signal could be steadily energized, in accordance with the requirements of practice.

The adjustment of the circuit for the series relay 3SR in the track circuit for the track section 3T can be provided so as to render such relay active at the intermediate point in the track section 3T as the eastbound train progresses, and thereby render the system effective to reach ahead another track section to initiate the coded track circuit apparatus associated with the track section 6T. The condition is diagrammatically illustrated in Figs. 3C and 3D wherein the entrance of a train into the track section 3T does not cause the initiation of the coded track circuit apparatus for track section 6T, but as the train progresses to a point as indicated in Fig. 3D, a series of events takes place by which the coded track circuit apparatus for the track section 6T is set into operation and the track circuit code builds up so as to provide for the energization of the green lamp G of signal 5 to provide a clear indication for governing the passage of the train into the track section 5T. By this arrangement it is provided that the signals are always conditioned in advance of a train to the extent that the signal governing entrance to any given track section is properly conditioned to display its most permissive indication, selected in accordance with traffic conditions in advance, prior to the entrance of an approaching train into the track section immediately in the rear of that signal.

To consider the general made of operation which takes place upon the progress of the train in the track section 3T so as to render the series relay 3SR active, reference can be made to Fig. 5 which illustrates the successive relay operations that are effective in response to the picking up of the series approach repeater relay 3SRP under such conditions. It will be noted that the picking up of relay 3SRP renders the inverse code transmitter inactive for the tract section 4T by the deenergization of the inverse code transmitter relay 4RCP. At the exit end of the track section 4T, the rendering inactive of the inverse code receiver at that end of the track section provides for the removal of the inverse code in the track section 5T by rendering the inverse code transmitter relay 5RCP inactive upon the dropping away of the relay 4FP.

At the exit end of the track section 5T, the cessation of the inverse code causes the dropping away of the relay 5FP, and the dropping away of that relay opens a circuit by which the relay 6RCP for the entrance end of the track section 6T has been maintained steadily energized, thus providing for the initiation of the driven code transmitter at the exit end of the track section 6T. In accordance with the initiation of this driven code transmitter, a series of events takes place in which the track circuit code in the track section 5T is built up to a signal clear code rate and thus the transmission of inverse code is initiated to forestall the removal of the steady energization from the track section 7T, all in a manner similar to that which has been described by which the steady energization of the track section 6T was considered to be maintained upon the reception of an inverse code at the exit end of the track section 5T.

To consider specifically the mode of operation of the relays under such conditions, it will be assumed that a train progresses in the track section 3T to a position to render the series relay 3SR active, and in response to the pulsing of contact 78 of relay 3SR, the series repeater relay 3SRP is maintained steadily energized. Upon the picking up of relay 3SRP, the inverse code transmitter relay 4RCP is rendered inactive upon the opening of the circuit for that relay at back contact 66.

At the exit end of the track section 4T, the rendering inactive of the relay 4RTR causes the dropping away of relay 4FP, and the dropping away of that relay opens the circuit by which the relay 5RCP has been active for the transmission of an inverse code in the track section 5T at front contact 70. In accordance with the cessation of inverse code transmission through the track rails of the track section 5T, the relay 5RTR becomes inactive, and by its dropping away opens the circuit for the relay 5FP at front contact 51 to provide for the dropping away of that relay. The opening of front contact 74 of relay 5FP opens the circuit for the relay 6RCP which has been steadily energized, and thus provides for the removal of the steady energization from the track section 6T upon the opening of front contact 77 of the relay 6RCP.

The removal of steady energization from the track section 6T causes the dropping away of the relay 6RTR and the dropping away of that relay closes a circuit at back contact 79 to provide for the picking up of the relay 6BP, and the picking up of that relay causes the dropping away of the timing relay 6TE by opening the circuit by which such timing relay is normally energized at back contact 80.

The relay 6FP is dropped away because of the opening of front contact 79 of relay 6RTR, and the dropping away of that relay renders the code transmitter relay 6CP active to transmit a code at a 75 rate, such relay being energized for each pulsing of the 75 code by a circuit extending from (+), including coding contact 75C, back contact 81 of relay 7H, back contact 82 of relay 6FP, back contact 83 of relay 6RTR, and winding of relay 6CP, to (−). The pulsing of contact 84 of relay 6CP applies the 75 driven code to the track rails at the exit end of the track section 6T, and the reception of such code pulses at the entrance end of that track section causes the pulsing of contacts 85 and 86 of the relay 6TP and thereby provides for the energization of the relay 6H.

The picking up of the relay 6H changes the code rate in the track section in the rear by the shifting of contact 53 in the circuit for the relay 5CP to cause such relay to be active at a 180 rate to transmit a signal clear code through the track rails of the track section 5T for the control of signal 5.

In accordance with the change in the code rate in the track circuit of track section 5T, the relay 5D is picked up, and the picking up of that relay provides a circuit for the energization of the green lamp G of signal 5 upon the closure of front contact 63. Such signal is energized at that time because the relay 4FP is dropped away in accordance with the prior removal of the inverse code from the track section 4T. Such inverse code will not be reestablished in that track section because the circuit for relay 4RCP is open at back contact 66 of relay 3SRP.

Upon the picking up of the relay 5D, the inverse code transmitter relay 5RCP is rendered active to apply an inverse code to the track rails at the entrance end of the track section 5T. The relay 5RCP is energized for the transmission of an inverse code pulse each time the relay 5TR is dropped away by a circuit extending from (+), including back contact 57 of relay 5TR, front contact 68 of relay 5TP, back contact 69 of relay 4SRP, front contact 87 of relay 5D, front contact 72 of relay 5H, and winding of relay 5RCP, to (−).

The reception at the exit end of the track section 5T of the inverse code causes the pulsing of the relay 5RTR which provides for the picking up of the relay 5FP by the pulsing of contact 51, and, because of relays 5FP and 5BP being both picked up, it is provided that the inverse code transmitter relay 6RCP is rendered active to transmit an inverse code pulse each time the relay 6TR is dropped away. The circuit by which relay 6RCP is energized for each inverse code pulse extends from (+), including back contact 88 of relay 6TR, front contact 89 of relay 6TP, back contact 90 of relay 5SRP, front contact 91 of relay 5FP, front contact 92 of relay 5BP, front contact 76 of relay 6H, and winding of relay 6RCP, to (−).

Upon the reception at the exit end of the track section 6T of the inverse code, the relay 6RTR becomes active and thus provides for the energization of the relays 6FP and 6BP by the pulsing of contact 79. In accordance with the energization of these relays a circuit is conditioned by which the relay 7RCP is maintained steadily energized upon the closure of the back contact 93 of the relay 6TE after such relay has become dropped away. Such circuit extends from (+), including front contact 94 of relay 6FP, front contact 95 of relay 6BP, back contact 93 of relay 6TE, back contact 96 of relay 7H, and winding of relay 7RCP, to (−).

Provided that there are no following trains, the steady energization is restored to the respective track sections in the rear of a train as it progresses along the trackway. Thus, under the conditions which have been assumed whereby an eastbound train has entered the track section 3T, the relay 3RCP becomes steadily energized, as soon as the starting track section 2T has become unoccupied in the rear of the train, by an obvious circuit closed at front contact 11. The steady energization of relay 3RCP closes front contact 12 to connect the track battery 13 across the track rails of the track section 3T. It is therefore provided that when the track section 3T becomes unoccupied in the rear of the train, the relay 3RTR becomes steadily energized, due to the steady energization applied to the track rails at the entrance end of the track section 3T. The picking up of the relay 3RTR renders the driven code transmitter relay 3CP inactive by opening the circuit for that relay at back contact 26.

The shifting of contact 15 of relay 3RTR upon the picking up of that relay provides for the picking up of relay 3FP and the dropping away of relay 3BP. In accordance with this operation a circuit is closed for the restoration of the timing relay 3TE to its normally energized condition by the closure of contacts 16 and 17 of relays 3FP and 3BP respectively.

In accordance with the picking up of the relay 3TE to complete the restoration to normal conditions of the apparatus associated with the track section 3T in the rear of a train, steady energization is applied to the relay 4RCP upon the closure of front contact 18 of relay 3TE, and thus the closure of front contact 20 of relay 4RCP applies steady energization to the track rails at the entrance end of the track section 4T to provide that the apparatus at the exit end of that track section will be restored to its normal conditions when the track section 4T becomes unoccupied in the rear of the train, such restoration being effective in a manner comparable to that which has been described as being effective for the apparatus associated with the exit end of the track section 3T.

In the case of a following train, it will be apparent that the initiation of the track circuit code apparatus for track sections in advance of such following train is effected in a similar manner to that which has been described. If the following train is sufficiently close to the train in advance so as to be progressing on a caution rather than a clear signal indication, it will be readily apparent that the track circuit coding apparatus is rendered active for the track sections in advance of that following train, but the inverse code is not applied to the track sections to forestall propagate of the starting of track circuit code transmitters because a clear signal control connot be transmitted through the track rails to render the inverse code transmitters active. If at any time, however, there becomes sufficient spacing between the trains to allow for the clearing of a signal (without the series repeater relay SRP being energized for the track section in the rear), the inverse code transmitters are rendered active to prevent the initiation of track circuit code apparatus for track sections farther in advance in a manner which has been heretofore described.

Among other advantageous features of the system provided by the present invention is the provision, by steadily energizing the respective track section under normal conditions, of a means for initiating the system upon the entrance of a train into a track section, irrespective of whether or not the coded track circuit has been active for the track section in the rear. In other words, if a train enters the equipped territory at an intermediate point, as entering from an outlying track switch, the shunting of the track rails of the first track section entered initiates the track circuit coding apparatus for that track section and for respective track sections in advance according to the mode of operation of the system as it has been described. It will also be readily apparent that in case of the failure of the apparatus associated with a particular track section to initiate the track circuit coding apparatus for track sections in advance, such failure does not prevent the operation of the apparatus of track sections farther in advance in its intended manner upon passage of the train through such advance track sections.

It will be noted from the mode of operation of the system as it has been described that although a time interval is provided between the rendering active of the track circuit coding apparatus for respective track sections, the timing operation is coextensive with the advance of a train from one track section to another during progress of a train through the equipped territory, and thus the apparatus is conditioned for the extension of track circuit coding to another block in advance before such extension is actually rendered effective. In other words, it is not necessary to wait for the dropping away of a time element relay TE before initiating track circuit coding in an advance track section subsequent to the removal of inverse code by the advance of a train because the relay TE involved is already dropped away at the time when the inverse code is removed.

After having considered specifically the organization of the circuits for a three-block signalling system, it is believed to be readily apparent to those skilled in the art that the principles of operation as they have been set forth are readily applicable to a four-block signalling system as well.

The apparatus at a typical signal location of a four-block signalling system is illustrated in Fig. 2 in which the same general organization as is illustrated in Figs. 1A and 1B is maintained, the modification of the system disclosed in those figures is accomplished by merely the modification of the driven code transmitters and code responsive means for the respective track sections to add another distinctive track circuit code for providing another distinctive indication, the initiation of the track circuit coding apparatus for the respective track sections being effective by the same general mode of operation as has been heretofore described.

With reference to Figs. 4A, 4B, 4C and 4D, various conditions of the track circuit control of signals for a four-block signalling system are illustrated. Fig. 4A illustrates the normal conditions of the system with the trackway unoccupied by trains in which the respective track sections are steadily energized from their entrance ends as has been described when considering specifically the mode of operation of a three-block signalling system.

In Fig. 4B, the initiation of the system by the approach of a train to the entering end of the equipped territory is illustrated, and upon comparing this track diagram with the track diagram of Fig. 3B which shows a similar traffic condition for a four-block signalling system, it will be noted that the track section 6T has its track circuit coding apparatus active as shown in Fig. 4B, while the track circuit coding apparatus is not yet rendered active for the corresponding track section in Fig. 3B. It will be readily apparent that this condition is in accordance with the requirements for the additional proceed-with-caution indication characteristic of four-block signalling systems as provided by a driven code at a 120 rate. Inasmuch as the application of an inverse code to the respective track sections to limit the intiation of track circuit coding apparatus farther in advance of a train is dependent upon a signal-clear code (180 rate), it will be readily apparent that the addition of the 120 code rate for the proceed-with-caution indication merely allows the track circuit coding apparatus to be initiated for a block farther in advance of an approaching train than would be accomplished in the three-block signalling system which has been heretofore described. Thus, it is provided in a four-block signalling system that the code rate must build up from a 75 code to a 120 code and then to a 180 code before the initiation of an inverse code transmitter.

With reference to Fig. 2, it will be noted that the apparatus of this figure corresponding to apparatus of Fig. 1A is identified by corresponding reference characters, and the description of the corresponding apparatus of Fig. 1A may be applied to the mode of operation of apparatus bearing similar reference character in Fig. 2. It will be noted that the apparatus in Fig. 2 provides for the control of an additional relay 4HD from the decoding transformer, such relay being energized upon the reception of a 120 driven code at the entrance end of the track section 4T, through a rectifier and tuned circuit 123DU which is tuned to provide that the relay 4HD is responsive only to that particular code rate.

It will be noted that the circuit for the code transmitter relay 3CP is modified in Fig. 2 to include a selection between a 120 code and a 180 code by the contact 97 of the relay 4HD. Thus, by this arrangement, the relay 3CP is rendered effective to transmit a 180 code when a 120 code is received at the entrance end of the track section 4T, and the control of relay 3CP is selected to transmit a 120 code as the most permissive signal indication when the relay 4HD is dropped away.

The signal control circuits for the signal $4^1$ of Fig. 2 are provided to be energized only in accordance with the closure of back contact 98 of relay 3FP in combination with front contact 99 of relay 3BP to provide the desired arrangement of approach lighting of the signals in accordance with the mode of operation which has been heretofore described with respect to the signals illustrated in Figs. 1A and 1B. The danger indication of signal $4^1$ is provided when the relay 4H is dropped away by the joint energization of the red lamps R and $R^1$ of that signal. Red lamp R can be energized when the relay 4H is dropped away, by a circuit extending from (+), including back contact 98 of relay 3FP, front contact 99 of relay 3BP, back contact 100 of relay 4H, and the red lamp R of signal $4^1$, to (−). The lamp $R^1$ can be energized at the same time by a circuit extending from (+), including back contact 98 of relay 3FP, front contact 99 of relay 3BP, back contact 101 of relay 4H, and the lamp $R^1$ of signal $4^1$, to (−).

A caution indication is provided by the signal $4^1$ by the joint energization of the lamps Y and $R^1$ upon the reception of a 75 code at the entrance end of the track section 4T to provide for the picking up of the relay 4H. Thus the lamp Y of signal $4^1$ can be energized when a 75 driven code is received by a circuit extending from (+), including back contact 98 of relay 3FP, front contact 99 of relay 3BP, front contact 100 of relay 4H, back contact 102 of relay 4D, and the yellow lamp Y of signal $4^1$, to (−). The lamp $R^1$ is energized by a similar circuit extending from (+), including back contact 98 of relay 3FP, front contact 99 of relay 3BP, front contact 101 of relay 4H, back contact 103 of relay 4D, back contact 104 of relay 4HD, and the red lamp $R^1$ of signal $4^1$, to (−).

When a 120 code is received at the enttrance end of the track section 4T, a proceed-with-caution indication is provided for the signal $4^1$ by the joint energization of the lamps Y and $Y^1$, the lamp Y being energized by the circuit heretofore described, and the lamp $Y^1$ being energized by a circuit extending from (+), including back contact 98 of relay 3FP, front contact 99 of relay 3BP, front contact 101 of relay 4H, back contact 103 of relay 4D, front contact 104 of relay 4HD, and the lamp $Y^1$ of signal $4^1$, to (−).

The clear indication of signal $4^1$ is provided by the joint energization of the lamps G and $G^1$ only in response to the reception of a 180 code at the entrance end of the track section 4T to cause the picking up of the relay 4D. Thus, the green lamp G of signal $4^1$ can be energized under such conditions by a circuit extending from (+), including back contact 98 of relay 3FP, front contact 99 of relay 3BP, front contact 100 of relay 4H, front contact 102 of relay 4D, and the green lamp G of signal $4^1$, to (−). The lamp $G^1$ is energized by a circuit extending from (+), including back contact 98 of relay 3FP, front contact 99 of relay 3BP, front contact 101 of relay 4H, front contact 103 of relay 4D, and the lamp $G^1$ of signal $4^1$, to (−).

Having thus described specifically the manner in which the circuit organization of the four-block signalling system of Fig. 2 differs from the three-block signalling system heretofore described with reference to Figs. 1A and 1B, and having pointed out the general mode of operation of such apparatus upon the passage of a train, it is believed to be readily apparent to those skilled in the art as to the manner in which a four-block signalling system can be provided.

Having thus described specific embodiments of the present invention as applied to respective three-block and four-block coded track circuit signalling systems, it is desired to be understood that these forms have been selected to facilitate in the disclosure of the invention rather than to limit the number of forms which the invention may assume, and it is to be further understood that various adaptations, alterations and modifications may be applied to the specific form shown to meet the requirements of practice without in any manner departing from the spirit or scope of the present invention except as limited by the appending claims.

What I claim is:

1. In a coded track circuit automatic block signalling system for multiple track railroads, a series of consecutive blocks each having a signal at the entrance end governing train movement in the same direction, code transmitting and code receiving apparatus associated with each end of each block and operable to provide driven code pulses in one direction for governing the indication of said signals and inverse code pulses in the opposite direction during the off interval between the driven code pulses, said apparatus for each block being normally at rest when no approaching train is within a limited distance of that block and being automatically set into operation by an approach starting control transmitted from block to block ahead of an approaching train, and means associated with each of the several blocks for governing the transmission and control effected by inverse code pulses of the same fixed polarity to restrict said approach starting control to a limited number of blocks ahead of a train in accordance with the number of different indications provided for said signals.

2. An automatic block signalling system for multiple track railroads of the coded track circuit type comprising, code transmitting and receiving apparatus associated with each end of each of a series of consecutive blocks, said apparatus for each block being operable at times to transmit driven code pulses of a selected rate in one direction and inverse code pulses of the same fixed polarity in the opposite direction during the off intervals of the driven code pulses, means effective in response to the presence of a train in any block for initiating a starting control over the track rails tending to be transferred from block to block ahead in succession to initiate driven code operation of the coding apparatus of such blocks, means for controlling the coding apparatus at the entrance end of each block to provide an inverse code of fixed polarity only if driven code pulses of a predetermined clear code rate are being received in that block or if an inverse code is being transmitted in the next block in the rear, and means effective in response to the reception of an inverse code at the exit end of any block prior to initiation of the coding operation in the next block ahead for preventing transfer of said starting control to that next block ahead.

3. In a coded track circuit automatic block signalling system for multiple track railroads the combination with a series of consecutive blocks each having a signal at the entrance end governing traffic in the same direction, of code transmitting and receiving equipment associated with each end of each of said blocks operable at times to transmit driven code pulses of a selected code rate through the track rails in one direction governing the associated signal indications and also inverse code pulses of a fixed polarity in the opposite direction during the off intervals of the driven code pulses, said coding equipment including initiating means responsive to the presence of a train for providing an approach starting control to initiate transmission of driven code pulses in a plurality of blocks ahead of the train in succession, said initiating means acting to transfer said starting control from one block to the next block ahead only after a time interval, means for rendering the inverse code transmitting means for each block effective only if a driven code at the clear code rate is being transmitted or an inverse code is being transmitted in the next block in the rear, and means at the exit end of each block responsive to the reception of an inverse code if received prior to the expiration of said time interval for that block and initiation of driven coding in the next block in advance for preventing transfer of said starting control to the next block in advance.

4. A coded track circuit for automatic block signalling system for multiple track railroads comprising, a track divided into a series of consecutive blocks each having a signal at the entrance end for governing train movement in the same direction, coding apparatus associated with each end of each block including a track relay, said coding apparatus being normally at rest while no train is approaching within a predetermined distance and acting to maintain the track relay at the exit end of that block steadily energized, said coding apparatus including initiating means responsive to the change of the track relay at the exit end of the corresponding block from its steadily energized condition for initiating transmission of a driven code from that exit end of that block, the rate of the driven code transmitted from the exit end of a block being dependent upon the number of unoccupied blocks in advance, said initiating means being also effective only after the lapse of a time interval to discontinue the steady energization of the track relay at the exit end of the next block in advance and thus initiate coding operation in that next block, means associated with said coding apparatus of each block for transmitting inverse code pulses of the same fixed polarity during the off intervals of the driven code in that block provided such driven code is at the highest code rate for giving a clear signal indication or provided an inverse code is being transmitted in the next block in the rear, and means at the exit end of each block effective if an inverse code is received prior to the expiration of said time interval and initiation of coding operation in the next block in advance for maintaining steady energization of the next block in advance, whereby a train causes approach starting control of coding operation in a number of blocks ahead by discontinuing stead energization of the blocks in succession until code operation has been started for a sufficient number of blocks to provide the highest code rate to clear the signal next ahead of the train.

5. In a coded track circuit block signalling system for multiple track railroads, a stretch of track divided into several consecutive blocks by the location of signals for governing a given direction of traffic, code transmitting and receiving apparatus at the respective entrance and exit ends of each of the blocks, said code transmitting apparatus at the exit end of each block being normally inactive but being effective when rendered active to transmit selected signal clear or signal caution control codes through the track rails for the control of the signal governing entrance to that block, said code transmitting apparatus at the entrance end of each block being effective to transmit an inverse code when rendered active, means including said code transmitting and receiving apparatus and initiated upon the approach of a train for rendering said code transmitter active at the exit end of successive track sections in advance of the train only in the absence of inverse code in the block in the rear, and means at the entrance end of each of the blocks including said code receiving apparatus responsive only to a signal clear code transmitted through the track rails from the opposite end of that block or to the reception of an inverse code in the block in the rear for rendering said inverse code transmitter active at that entrance end.

6. In a coded track circuit signalling system for multiple track railroads for a stretch of track divided into successive blocks and having four indication signals for governing entrance to the respective blocks for the same direction of traffic, code transmitting and receiving apparatus at each end of each of the blocks, said code transmitting aparatus at the entrance end of each of the blocks being normally effective to apply steady energization to the track rails of that block and being effective to transmit an inverse code only upon the reception of the highest of three different code rates transmitted to the track rails from the opposite end of that block or in response to an inverse code transmitted through the track rails of the block in the rear, said apparatus including initiating means for rendering said code transmittig apparatus active at the exit end of each of several blocks in advance of a train by the removal of steady energization from the track rails of such blocks, the initiation of said code transmitting apparatus being effective for each block only in the absence of inverse code in the block in the rear, and said code receiving apparatus at the entrance end of each block being effective to select one of said three different code rates for transmission through the track rails of the block in the rear, such rate being selected in an increasing order in accordance with the respective number of track sections in advance that are unoccupied by a train, whereby the limitation of propagation of said block by block initiation of code transmitting apparatus is applied only after track circuit code has built up to include three distinctive code rates in three adjoining blocks for the control of four block indication signals.

7. In a coded track circuit automatic block signalling system for multiple track railroads comprising, a series of consecutive blocks, each of said blocks having a signal at the entrance end for governing train movement in the same direction, a transmitter relay for the entrance end of each block for energizing the track rails of that block, a track relay for the exit end of each block operated in response to the condition of said transmitter relay of that block, a time element device for each block effective only if said track relay of that block is steadily energized for steadily energizing said transmitter relay for the next block in advance, and means actuated by the intermittent operation of said track relay for maintaining steady energization of the transmitter relay for the next block in advance when said time element device is not effective.

8. In a coded track circuit block signalling system for railroads for a stretch of track divided into a series of successive blocks, each block having a signal at the entrance end governing train movement in one direction, a source of current and a track relay for the entrance end of each block, an inverse code transmitter relay for rendering said source of current and track relay alternately effective, an inverse code operating circuit for intermittently energizing said transmitter relay in response to the intermittent operation of said track relay, a circuit for steadily energizing said transmitter relay, and decoding means energized only in response to the intermittent operation of said track relay and acting as said decoding means is energized and deenergized to selectively connect one or the other of said circuits to said transmitter relay.

9. In a coded track circuit signalling system for multiple track railroads, the combination with normally inactive track circuit code transmitting and receiving apparatus for a plurality of consecutive blocks initiated into operation block by block upon the approach of a train, of a timing device at the exit end of each block having initiating and operated positions for providing a time delay in the removal of steady energy from the next block in advance, and a circuit for governing said timing device effective to intiate said device upon the removal of steady energization from the track rails of that block, and effective to restore said device from said operated position to said initiating position only in response to the steady energization of the track rails of that block even though the track rails may become intermittently energized while said device is in its operated position.

10. In a coded track circuit signalling system of the character described for multiple track railroads, the combination with a track relay connected to the track rails at the exit end of a block, a front contact repeater relay of said track relay, and a back contact repeater relay of said track relay, of a code transmitter relay at the exit end of said block and a circuit for controlling said code transmitter relay to render that code transmitter relay active for the transmission of a driven code only if said front contact repeater relay is dropped away or said back contact repeater relay is picked up.

11. In a coded track circuit block signalling system for multiple track railroads having a series of blocks and a signal for governing the entrance to each of the blocks for a given direction of traffic, a source of energy and a track relay at each end of each of the blocks, code transmitting means at the entrance end of each of the blocks effective to connect said source of energy steadily to the track rails of that block normally but to intermittently connect said source and said track relay alternately to the track rails upon the approach of a train within a predetermined number of blocks, and means effective when said track relay at the exit end of each of the blocks is steadily energized for selecting a lower potential for application to the track rails of the next block in advance than is provided for inverse code pulses when said code transmitting means is active for the transmission of an inverse code in that block.

12. In a coded track circuit signalling system for multiple track railroads, a stretch of track divided into blocks by the location of signals governing traffic in the same direction, code transmitting and receiving apparatus at the entrance and exit ends of each block operable normally to steadily energize the track rails at one potential at the entrance end but effective to apply a higher potential to the track rails in the absence of steady energization in the block in the rear, said apparatus including means effective in response to the advance of a train block by block to remove the steady energization of the track rails a predetermined number of blocks in advance of the train and thereby render said code transmitting apparatus active to control the signal governing the entrance to that block and render said code transmitter apparatus active at the entrance end of that block to transmit inverse code pulses at said higher potential.

13. In a coded track circuit signalling system for multiple track railroads for a stretch of track divided into blocks by the location of signals for governing the same direction of traffic, inverse code transmitting apparatus at the entrance end of each of the blocks normally active to steadily energize the track rails but initiated into operation for the transmission of an inverse code when that block is a predetermined number of blocks in advance of a train, and potential selecting means for selecting a higher potential for application to the track rails of each block at the entrance end for the transmission of an inverse code than the potential normally employed for the steady energization of the track rails.

14. A coded track circuit automatic block signalling system for a stretch of railroad track having blocks signalled for train movement in one direction only, a normally inactive coded track circuit for each block, said track circuit when set into coding operation being operable to transmit a signal control driven code selected from a plurality of different code rates toward the entrance end of that block and said track circuit being operable at times to transmit inverse code pulses in the opposite direction, said track circuit having code selecting means associated therewith for selecting the next higher code rate of said plurality of different code rates to be transmitted through that track circuit than is transmitted through the next block in advance, means responsive to the cessation of inverse code pulses in a given block for initiating coding operation of the track circuit for the next block in advance, said means for a given series of blocks cooperating to govern the transmission of inverse code in a plurality of blocks and initiate coding operating of the track circuits of such blocks until the highest code rate of said plurality of code rates exists in the foremost block of said series, and means at the exit end of each block including a series relay in series with the source of coded current for that block for cutting off the inverse code in the next block in advance when a train reaches a point in that block where its associated series relay is energized by such train.

NEIL D. PRESTON.

REFERENCES CITED

The following references are of record in the file of this patent:

UNITED STATES PATENTS

| Number | Name | Date |
|---|---|---|
| 2,360,948 | Jerome ____________ | Oct. 24, 1944 |